Sept. 26, 1961

R. W. WARREN

FLUID PULSE CONVERTER 3,001,698

Filed Oct. 5, 1960

10 Sheets-Sheet 1

INVENTOR

Raymond W. Warren

S. J. Rotondi, A. J. Dupont,
BY F. E. McGee & J. M. Presson

Sept. 26, 1961 R. W. WARREN 3,001,698

FLUID PULSE CONVERTER

Filed Oct. 5, 1960 10 Sheets-Sheet 2

INVENTOR

Raymond W. Warren

BY S. J. Rotondi, A. J. Dupont, F. E. McGee & J. M. Presson

Sept. 26, 1961 R. W. WARREN 3,001,698

FLUID PULSE CONVERTER

Filed Oct. 5, 1960 10 Sheets-Sheet 3

INVENTOR
Raymond W. Warren

BY S. J. Rotondi, A. T. Dupont, F. E. McGee & J. M. Presson

Sept. 26, 1961 R. W. WARREN 3,001,698

FLUID PULSE CONVERTER

Filed Oct. 5, 1960

10 Sheets-Sheet 4

INVENTOR.

Raymond W. Warren

BY

S. J. Rotondi, A. T. Dupont,

F. E. McGee & J. M. Presson

INVENTOR.
Raymond W. Warren
BY
S. J. Rotondi, A. J. Dupont,
J. E. McGee & J. M. Preston INVENTOR.
Raymond W. Warren
BY
S. J. Rotondi, A. J. Dupont,
J. E. McGee & J. M. Presson Sept. 26, 1961 R. W. WARREN 3,001,698

FLUID PULSE CONVERTER

Filed Oct. 5, 1960 10 Sheets-Sheet 7

INVENTOR.
Raymond W. Warren
BY
S. J. Rotondi, A. T. Dupont,
F. E. McGee & J. M. Presson INVENTOR.
Raymond W. Warren
BY
S. J. Rotondi, A. T. Dupont,
F. E. McGee & J. M. Pressen INVENTOR.
Raymond W. Warren
BY
S. J. Rotondi, A. J. Dupont,
F. E. McGee & J. M. Presson Sept. 26, 1961 R. W. WARREN 3,001,698

FLUID PULSE CONVERTER

Filed Oct. 5, 1960 10 Sheets-Sheet 10

INVENTOR

Raymond W. Warren

BY S. J. Rotondi, A. T. Dupont, F. E. McGee & J. M. Presson 3,001,698
FLUID PULSE CONVERTER Raymond W. Warren, 2515 Seneca Ave., McLean, Va.

Filed Oct. 5, 1960, Ser. No. 60,763
19 Claims. (Cl. 235—61)
(Granted under Title 35, U.S. Code (1952), sec. 266)

The invention described herein may be manufactured and used by or for the Government for governmental purposes without the payment to me of any royalty thereon.

This invention relates to fluid systems in general, and more specifically to a fluid system capable of converting sequential fluid pulses into alternating fluid pulses, without the use of moving parts.

Fluids in motion are widely used in military and industrial systems. Machine tools, steam engines, internal combustion engines, rocket motors, and many other devices depend upon precise and timely control of moving fluids for proper operation. Application of the principles of hydraulics and pneumatics has led to a wide variety of rugged, reliable, fluid-actuated systems including fluid amplifiers.

Known fluid amplification and control systems employ moving parts, such as pistons, linkages, valves, diaphragms or vanes, to accomplish their objectives. In many applications, the use of moving parts does not prevent the system from operating as intended. However, in other cases a system with moving parts suffers limitations because of friction, wear and deterioration, thermal expansion, or because of the inertia or weight of these parts. In particular, the response time of such fluid-actuated system is severely limited by the inertia of these moving parts. From the viewpoint of reliability, ruggedness and storage life, as well as response time, simplification of a system by elimination of moving parts is highly desirable.

It was discovered recently that a fluid-operated system having no moving parts other than the fluid could be constructed so as to provide fluid systems in which the proportion of the total energy of a fluid stream delivered to an output orifice or utilization device is controlled by a further fluid stream of lesser total energy. These systems are generally referred to as fluid amplifiers.

According to this invention such a fluid amplifier is employed in a fluid pulse converter. The fluid amplifier preferably is one which utilizes boundary layer lock-on control as disclosed in the patent applications of Romald E. Bowles and Raymond W. Warren, Serial No. 855,478, filed November 25, 1959, entitled "Multistable Fluid-Operated System," and Serial No. 4,830, filed January 26, 1960, entitled "Fluid Multistable Memory System." The following description is an aid in understanding some of the control principles involved in this type of fluid amplifier.

In a boundary-layer-controlled fluid amplifier, a high energy power jet is directed towards a target area or receiving aperture system by the pressure distribution in the power jet boundary layer region. This pressure distribution is controlled by the wall configuration of the interaction chamber, the power jet energy level, the fluid transport characteristics, the back-loading of the amplifier output passages and the flow of control fluid to the power jet boundary layer region. In this type of fluid amplifier special design of the interaction chamber configuration permits designs wherein the power jet will lock-on to one side wall and remain in the locked-on flow configuration without a control fluid flow. When the power jet is suitably deflected by a control fluid flow it can lock-on to the opposite side wall and remain in the locked-on flow configuration even after the control fluid flow is stopped. Thus this unit possesses positive feedback since the feedback path is created and destroyed each time the power jet is deflected to another position. The feedback path which is destroyed and re-established each time the power jet is deflected to another position becomes the flow pattern within the interaction chamber and is determined by the chamber configuration and the power jet flow.

The fluid amplifiers disclosed in the aforementioned patent applications control the delivery of energy of a main stream of fluid to an outlet orifice or utilization device by means of control fluid flow issuing from a control nozzle generally at right angles to the main stream. The proportion of the relatively high energy main stream delivered to an orifice may be varied as a linear or non-linear function of the relatively low energy of a control stream interacting therewith. Since the energy controlled is larger than the control energy supplied, an energy gain is realized and amplification in the conventional sense is realized.

Fluid amplifiers may also be provided with memory characteristics. Such amplifiers are hereafter referred to as memory systems. These systems are designed so that the fluid stream flowing through the system will persist in trying to exhaust into that aperture through which it is initially directed by fluid flow from one of the control nozzles, even after the control fluid flow has ceased and despite partial or complete blockage of discharge from that aperture.

Some applications require that the successive switching of the fluid flowing through the memory system from one aperture to the opposite aperture occur as a result of successive fluid pulses received from some common source. For example, if the memory system is to be used as a scaler in a fluid digital computer, switching of the fluid stream from one aperture to the other must occur as a result of a single input tube conveying a series of pulsed fluid signals to the unit.

The memory system disclosed in application Serial No. 855,478 was initially designed so that the control nozzles received alternating fluid pulses from separate sources of fluid signals. Thus one control nozzle would receive a fluid pulse from one source and the opposed control nozzle receive a fluid pulse from another source. Merely connecting the tubes extending from the control nozzles to a single tube conveying a series of pulsed fluid signals would not cause the control nozzles to issue the required successively alternating jets. Thus the problem arose of providing a suitable tube connection between a single input tube conveying a pulsed fluid signal and the control nozzles of a fluid amplifier having the memory feature so that each nozzle would alternately issue a jet to cause switching of the fluid stream in the memory system in response to sequentially pulsed fluid signals received from a single input tube.

It is therefore an object of my invention to provide a fluid pulse converter capable of converting sequential fluid pulses received thereby into alternating fluid pulses.

It is also an object of this invention to provide a fluid pulse converter capable of converting sequential fluid pulses received thereby into alternating fluid pulses without the need of moving parts, other than the fluid required for the operation thereof.

Another object of this invention is to provide a fluid pulse converter which comprises a fluid memory system in combination with a novel tube and nozzle connection between a source of sequentially pulsed signals and the memory system.

A further object of this invention is to provide a binary fluid computer or counter which employs fluid pulse converters as flip-flops or scalers therein.

Another object of this invention is to provide a fluid binary counter capable of counting sequential fluid pulses received by one converter of a series of pure fluid pulse converters which comprise the counter.

The specific nature of the invention, as well as other objects, uses, and advantages thereof, will clearly appear from the following description and from the accompanying drawing, in which:

FIG. 1 is a plan view of one form fluid pulse converter constructed in accordance with this invention.

FIG. 1*a* is a side elevation of FIG. 1.

Figure 4:
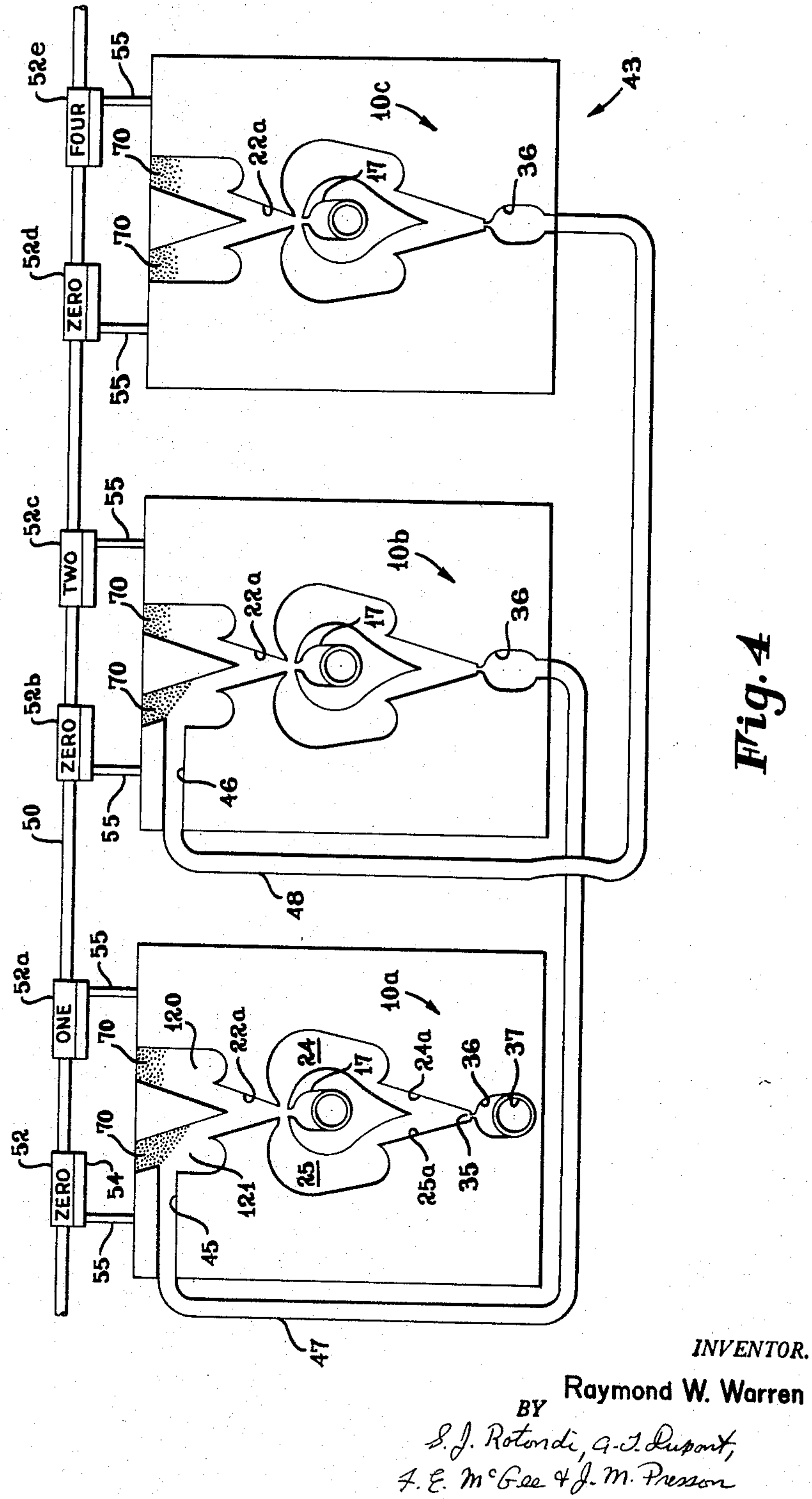
FIG. 4 is a plan view of one embodiment of a fluid binary counter utilizing the fluid pulse converters as fluid flip-flops or scalers.
Figure 5:
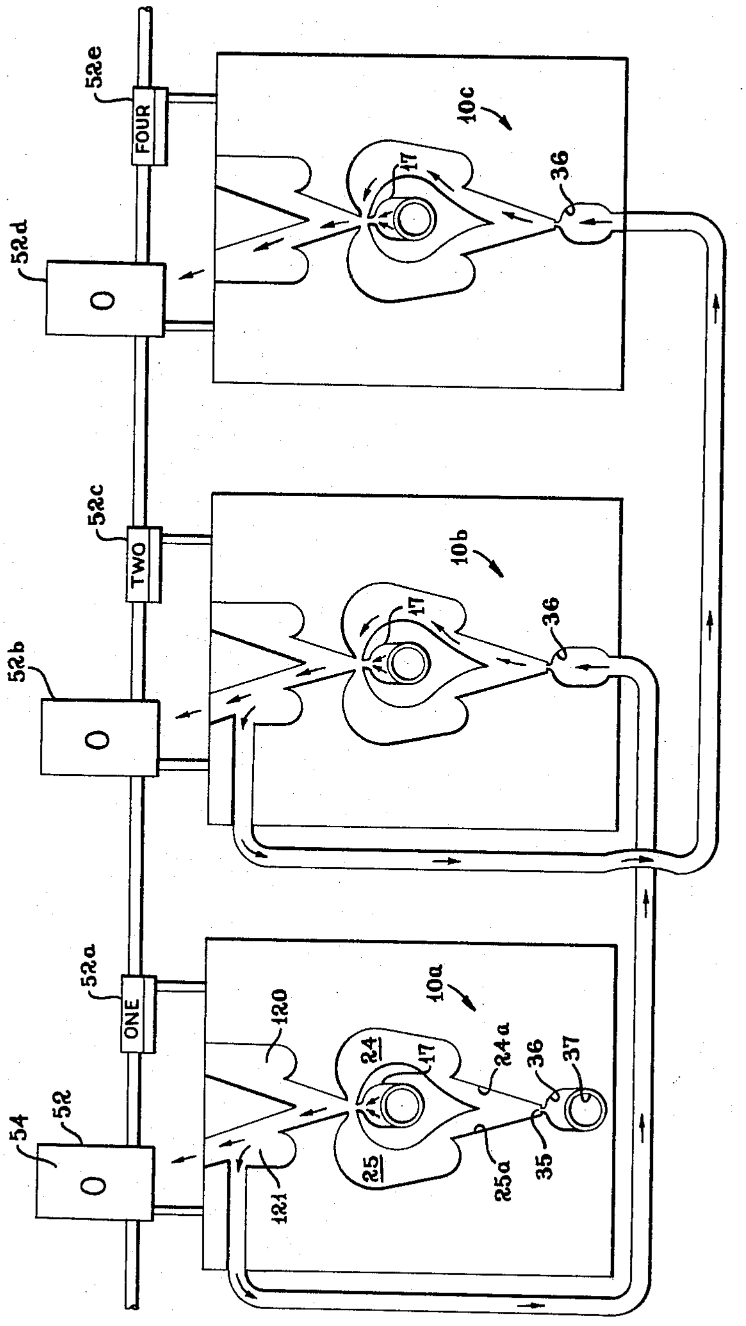

FIGS. 5–9 inclusive illustrate the fluid flow pattern through the binary counter shown in FIG. 4, so that the counter can add successive or sequential fluid pulses received thereby.

Figure 10:
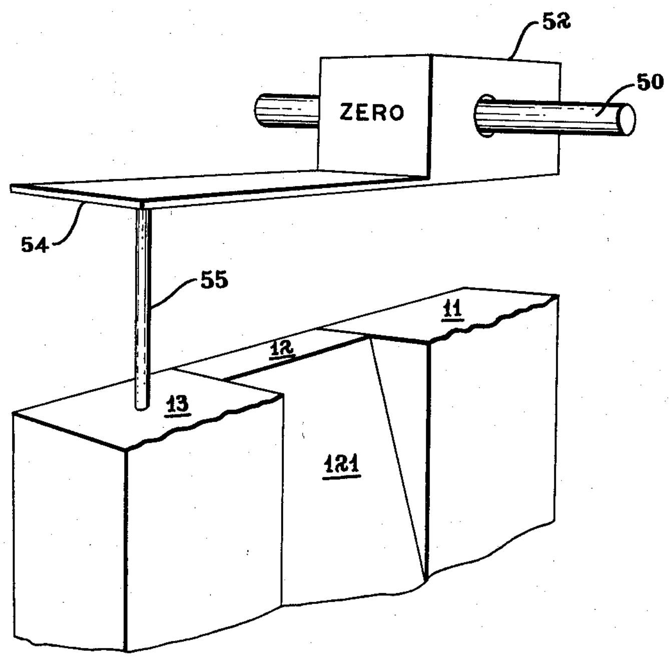

FIG. 10 is a partial sectional view of an output tube of a fluid pulse converter, and in addition illustrates in detail the construction of a typical number indicator tab.

According to this invention a pair of substantially opposed control nozzles of a fluid amplifier are connected to a novel tube system so that a pressure differential is created in the tube system when a power jet flowing between the nozzles more closely approaches one control nozzle than the other. This pressure differential is used to steer sequential pulses conveyed to the tube system into the one control nozzle so that the fluid flowing between the nozzles will be deflected by the one control nozzle towards the other control nozzle. Sequential fluid pulses can thusly be converted into alternating fluid pulses. The fluid converter which performs this conversion function has no moving parts, other than the moving fluid employed therein. By suitably connecting two or more of these converters together a binary computer or counter can also be provided which will function with a minimum number of moving elements or parts.

Figure 1:
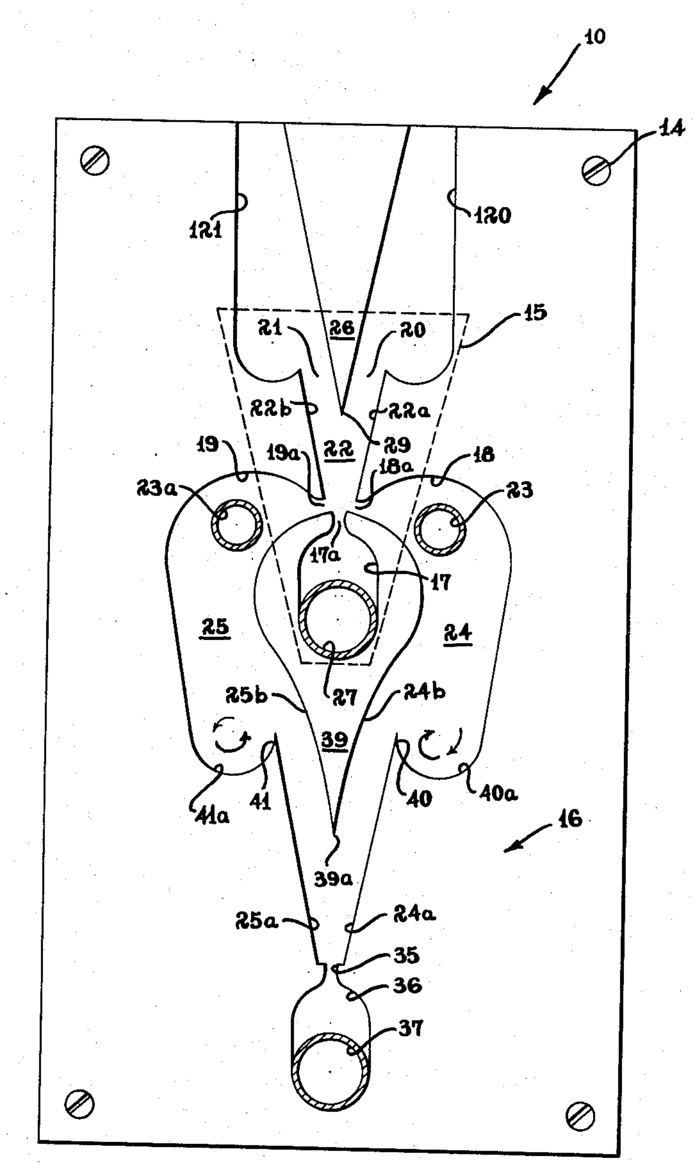
Figure 1A:
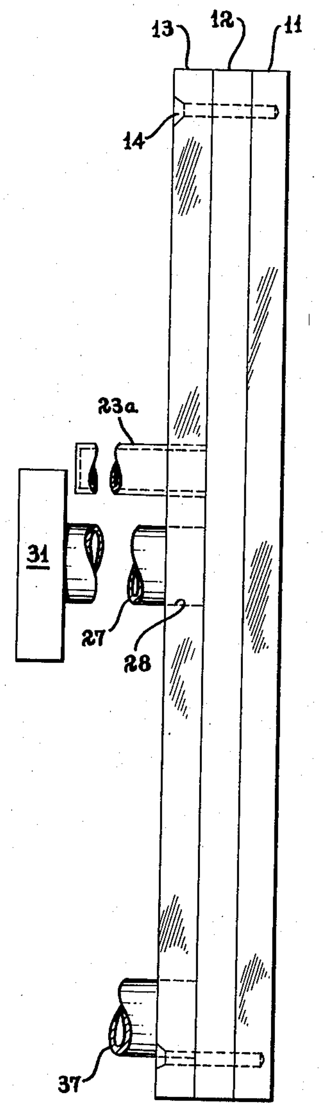

FIGS. 1 and 1A illustrate one embodiment of a pure fluid pulse converter constructed in accordance with this invention and referred to by numeral 10. Converter 10 is formed by three flat plates 11, 12 and 13, respectively. Plate 12 is positioned between plates 11 and 13, and is tightly fixed therebetween by machine screws 14. Plates 11, 12 and 13 may be composed of any metallic, plastic, ceramic or other suitable material, and for purposes of illustration are shown composed of a clear plastic material. It will be evident that the plates may also be fixed together by adhesives or any other suitable connective means.

The configuration (FIG. 1) cut from plate 12 delineates converter 10. Converter 10 consists of a fluid memory system 15, encompassed by phantom lines as shown, and a tube and nozzle connection referred to by numeral 16. Fluid memory system 15 includes a fluid supply or power nozzle 17, a pair of control nozzles 18 and 19, and apertures 20 and 21. Orifices **18*a* and 19*a* formed by control nozzles 18 and 19 respectively, communicate with chamber 22. Fluid is supplied to unit 15 by nozzle 17 from any source 31 (FIG. 1A) capable of producing substantially constant fluid flow. System 15 is, of course, basically a fluid amplifier having a memory characteristic, as discussed above. Opposed nozzles 18 and 19 form fluid control nozzles for system 15**.

A pair of hollow tubes 23 and **23*a* may be utilized to provide "capacitance" to tube connection 16. The term "capacitance" as employed herein is defined as that class of fluid energy storage means which stores fluid potential energy. In general, the energy stored in a fluid capacitance increases as a result of introduction of additional fluid therein. Thus a hollow tube such as tube 23 or 23*a* having one end sealed may provide a fluid capacitance for pulse converter 10. Such capacitances may be employed in cenverter 10 to increase the stability of deflection of the fluid jet which issues from nozzle 17**.

Referring now to memory system 15, the usual jet interaction chamber 22 is formed between chamber walls **22*a* and 22*b*. Apertures 20 and 21 provide orifices for output tubes 120 and 121, respectively, and are formed by the tip 29 of blade 26 and the walls of output tubes 120 and 121**.

Orifice **17*a* should preferably be positioned slightly closer to one chamber wall 22*a* or 22*b* than the other, depending upon which aperture 20 or 21 is to initially receive fluid from nozzle 17. The asymmetrical positioning of orifice 17*a* with respect to chamber wall 22*a* or 22*b* insures that when flow is initiated in nozzle 17, it will always flow into one aperture. Flow into one preselected aperture 20 or 21 can also be effected by inclining the nozzle slightly or by rounding one side of the orifice 17*a*. The fact that flow from nozzle 17 can be directed initially into one of the apertures permits "reset" of converter 10**. The "reset" feature will be discussed in greater detail hereafter.

Bore 28 (FIG. 1A) in plate 13 is internally threaded so that tube 27, which is externally threaded, can be tightly secured therein. The end of tube 27 extending from plate 13 is attached to source 31 of pressurized fluid. The pressurized fluid can be air or other gas, or water or other liquid. Gas, with or without solid or liquid particles, may also be employed. A conventional fluid-regulating valve (not shown) may also be used in conjunction with source 31 to insure continuous flow of fluid at a constant pressure.

System 15 is described above as possessing a "memory." The term "memory," as stated above, refers to the characteristic of the fluid stream from nozzle 17 to persist in trying to exhaust into that aperture 20 or 21, through which it is initially directed by fluid flow from one of the control nozzles 18 or 19, respectively, even after the control fluid flow has ceased from the control nozzles and despite partial or total blockage of discharge from the output tube 120 or 121 associated with that aperture. A detailed analysis and description of the functioning of a memory unit 15 is disclosed in patent application Serial No. 855,478 of Romald E. Bowles and Raymond W. Warren.

Control nozzles 18 and 19 are respectively connected to the ends of tubes 24 and 25, which form the uppermost ends of the nozzle and tube connection 16. Peripheral walls **24*a* and 25*a* define the outer walls of the tubes 24 and 25 which terminate at orifice 35 formed by nozzle 36. Walls 24*a* and 25*a* are setback from orifice 35 so that fluid issuing from nozzle 36** will lock on to either of these walls in accordance with the boundary layer control principle discussed above.

While walls **24*a* and 25*a* are setback from either side of orifice 35, their respective opposite inner walls 24*b* and 25*b* intersect to form a flow divider 39, as shown. The tip 39*a* of divider 39 is vertically aligned (as viewed in FIG. 1) with the center of orifice 35 formed by input nozzle 36**.

Tube 37 is the single input tube which communicates with input nozzle 36 and with a source of compressed fluid (not shown). Any conventional flow interruption or flow pulsing means (not shown) may be positioned between the source of compressed fluid and tube 37. Such a pulsing means may, for example, consist of a spring-actuated plunger, which when depressed manually or otherwise, interrupts flow into tube 37 for any period or interval of time.

It is desirable to have nozzle orifice 35 and walls **24*a* and 25*a* symmetrical so that slight flow from tube 25 to 24, or vice-versa, induced by a pressure differential in the tubes will positively influence the fluid jet from input nozzle 36** into the proper tube.

The required pressure differential induced in tubes 24 and 25 is created when the fluid stream from nozzle 17 is deflected against wall 22b of chamber 22 by a jet from nozzle 18, for example. A lower pressure region will be created across orifice 19a, in nozzle 19, and in tube 25 as a consequence of fluid flow over wall 22b than exists across orifice 18a, in nozzle 18, and in tube 24. When the fluid stream from nozzle 17 is deflected against chamber wall 22a by fluid issuing from control nozzle 19, a lower pressure region will be created in nozzle 18 than exists in nozzle 19.

The vacuums which can be successively created across the orifices of the control nozzles and in the control nozzles themselves as fluid successively flows over opposite chamber walls create pressure differentials in tubes 24 and 25 which are utilized to provide alternating switching of the fluid stream, as will hereafter be evident.

As the fluid stream issues from nozzle 17 it will entrain fluid in chamber 22. The fluid stream from nozzle 17 can be positioned slightly closer to wall 22b than to wall 22a, by for example, positioning nozzle 17 slightly closer to wall 22b, inclining nozzle 17 slightly toward wall 22b or otherwise, as discussed above. If the fluid stream is slightly closer to wall 22b than to wall 22a the pressure on the side of the fluid stream toward wall 22b will be slightly lower than on the side of the fluid stream toward wall 22a. This difference in pressure causes the fluid stream to move slightly toward wall 22b and the movement towards wall 22b causes a further reduction in pressure on the side of the fluid stream toward wall 22b. The stream bends until it finally locks-on to wall 22b.

With the fluid stream from nozzle 17 locked-on to the chamber wall 22b the pressure in nozzle 19 and tube 25 will be lower than the pressure in nozzle 18 and in tube 24. The difference in pressure in tubes 24 and 25 will induce a small fluid stream to flow from 18 around tip 39a to nozzle 19. The velocity and mass flow induced is insufficient to unlock the fluid stream issuing from nozzle 17 from the wall 22b. If a fluid pulse is thereafter fed to nozzle 36 the lower pressure existing in tube 25 and the small fluid stream flowing from 24 to 35 causes all the fluid from nozzle 36 to flow into tube 25. Fluid flowing into tube 25 issues from nozzle 19 as a jet. This jet supplies fluid to the boundary layer along wall 22b. Sufficient fluid is supplied to the boundary layer to raise the pressure therein until the differential in pressure is no longer sufficient to hold the stream onto wall 22b. Consequently, the stream from nozzle 17 will swing to the center of chamber 22 evacuating fluid between it and wall 22a until the decrease in pressure between the stream and wall 22a causes the stream to lock-on to that wall. Thus, the stream issuing from nozzle 17 will switch from aperture 21 into aperture 20. A bistable switching action occurs between apertures 20 and 21 since memory system 15 will cause a definite switching of the fluid stream from the power nozzle 17 as a result of alternating fluid jets issuing successively from each of the control nozzles 18 and 19.

Since the fluid stream from power nozzle 17 is now issuing from aperture 20, a lower pressure region is created across orifice 18a of control nozzle 18 with the result that after tube 25 ceases to supply fluid to nozzle 19, tube 24 will be at a lower pressure than tube 25. Consequently, the next fluid pulse from input tube 37 will flow into tube 24 where it can issue from nozzle 18, thereby switching the fluid stream into output aperture 21.

Should the fluid signal applied to tube 37 be a pulsating sequential series of fluid stream, or jets, the fluid stream issuing from nozzle 17 will be alternately deflected from one aperture to another in system 15, and thus from one output tube to another as a consequence of the induced pressure differential in the nozzle and tube connection 16. Tubes 24, 25 and nozzle 36 thusly cooperate to convert sequential fluid pulses received by tube 37 into alternating fluid pulses. It should be noted that no moving parts are required to perform the conversion function in pulse converter 10. Also, once the fluid stream locks-on to one wall of the chamber 22, it remains locked-on to that wall in the absence of fluid from both control nozzles 18 and 19. Since memory system 15 is basically a pure fluid amplifier, the large energy stream from nozzle 17 will be deflected by jets from the control nozzles 18 or 19 having lesser energy.

In order to ensure that the fluid flowing along either tube wall 24a or 25a will remain locked-on to the tube wall against which the stream has been deflected by the pressure differentials in the control nozzles, the tube walls shown in FIG. 1 are provided with sharp changes of slope. These sharp changes of slope may take the form of hooks 40 and 41. Fluid vortices are created within the curved walls 40a and 41a provided by hooks 40 and 41, respectively, as fluid passes over the hook tips. Vortices so created rotate as indicated by the arrows in FIG. 1, and aid in maintaining the reduced boundary layer pressure between the walls 24a and 25a and the fluid stream flowing thereover. As the pressure in the boundary layer between the fluid stream and the walls 24a and 25a decreases, the tendency of the fluid stream to remain locked-on to the walls increases, as will be apparent.

As previously discussed, when the power jet is issuing out of outlet 121 there is a reduced pressure in orifice 19a and a higher pressure in orifice 18a. When the power jet is flipped from outlet 121 to 120, the pressure in orifice 19a is suddenly raised which creates a compression wave in passage 25. At the same time the pressure in orifice 18a is suddenly lowered which creates a rarefaction wave in passage 24. If these waves were permitted to travel to the opposite control orifices 19a and 18a the power jet 17 would be flipped from wall 22a to 22b. The process would repeat and oscillation would result.

Oscillation is prevented by reflecting and intermixing both types of waves. Reflection is achieved by the combined effect of the funnel shape of connection 16, the downward extension of tip 39a into that connection and by curved walls 40a and 41a.

Walls 24a and 25a reflect the waves against divider 39 and against walls 40a and 41a until the two types of waves are substantially intermixed. The result is that only small portions of these waves arrive at an opposite orifice from which they originated and the phase relationship is so intermixed that the stability of the power jet from orifice 17a is not effected by these waves.

The compression and rarefaction waves can also be intermixed by porous resistances (not shown in this embodiment) in the tube connection.

Pulse converter 10 can be used for any purpose where it is desired to produce a bistable switching action when the system receives a pulsed signal from a single input tube. If required for the particular application, fluid resistors such as porous plugs (not shown) may be inserted in tubes 120 and 121 to break up the stream flowing from these tubes and to provide proper backloading for the system 15.

Figure 2:
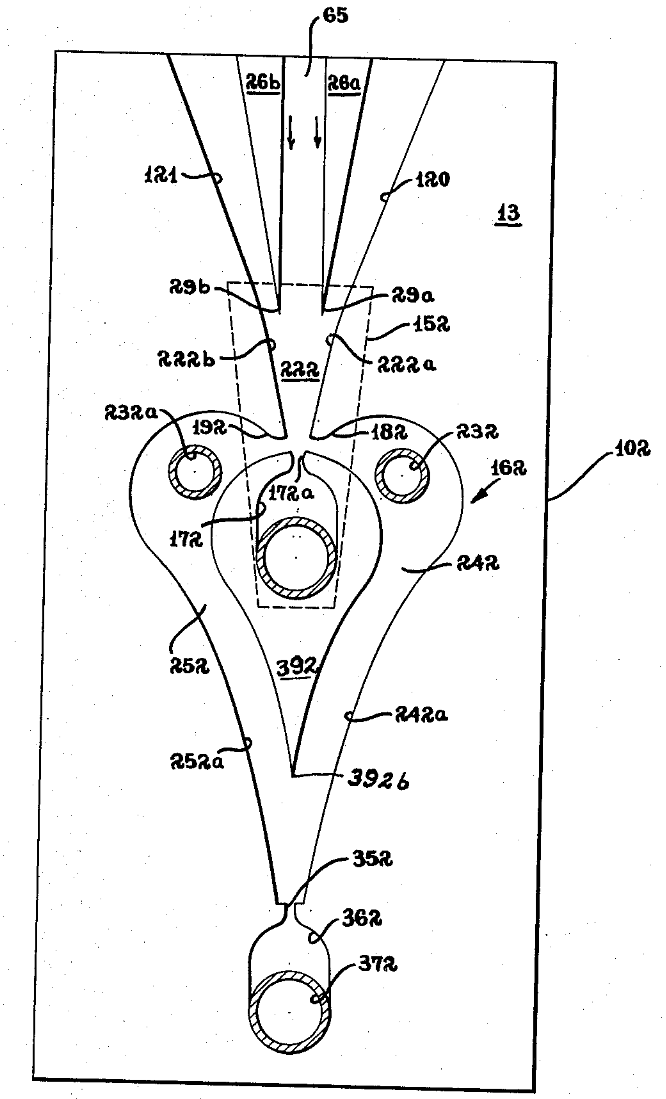
FIG. 2 is a plan view of another embodiment of a fluid pulse converter constructed in accordance with this invention.

FIG. 2 illustrates another embodiment of a fluid pulse converter constructed in accordance with this invention. This converter, referred to by numeral 102, is similar to converter 10 since it is comprised of a memory system 152 and a novel tube and nozzle connection 162. In memory system 152 the flow divider blade is split in half forming two sections 26a and 26b. The "memory" feature is achieved in system 152 by spacing the tips 29a and 29b of sections 26a and 26b respectively, a substantial distance from orifice 172a. This distance should be at least equal to twelve orifice widths of orifice 172a. Such spacing of the tips of the flow dividers from the orifice 172a will ensure that the fluid stream from nozzle 172 will remain locked-on to the chamber wall 222a or 222b against which it was initially deflected even though the output tube from which the stream would issue is heavily backloaded. Sharp changes of chamber wall slope are not required in this system in order to achieve the memory characteristic described above.

Nozzle and tube connection 162 cooperating with system 152 comprises tubes 242 and 252 as well as input nozzle 362 and its associated input tube 372. It will be understood that connection 162 functions in the manner and for the same reasons as the tube and nozzle connection 16 described above, and also requires no moving elements. In this embodiment the tube walls **242*a* and 252*a* are not provided with a sharp change of slope since sufficient boundary layer lock-on can be achieved by the setback of walls 242*a* and 252*a* from orifice 352**.

Slot 65 formed between plates 11, 13 and the opposite edges of sections **26*a* and 26*b* is open to the atmosphere, whereas output tubes 120 and 121 can be connected to suitable flow utilization devices. If the output tubes 120 and 121 of converter 10 (FIGS. 1 and 1A) are heavily backloaded, for instance as a result of connecting the output tubes of a number of converters in series, converter 10 may not provide the desired alternate switching of the fluid stream between apertures 20 and 21. Probably the reason why converter 10 may not function properly under heavy backloading conditions is because the fluid stream as it flows along either chamber wall 22*a* or 22*b* must receive some positive pressure to hold it against the chamber wall, when the output tubes are completely or substantially blocked. While there exists a lower pressure in the boundary layer region between the fluid stream and the chamber wall 22*a* or 22*b*, this lower pressure region may not of itself be sufficient to keep the stream locked-on to the chamber wall when there is an absence of some positive pressure on the other side of the fluid stream. This condition will arise when there is not fluid flow from other than from where the fluid stream is flowing, that is, from nozzle 17 in converter 10**.

Converter 102 solves the problem of insuring stability of deflection under heavy backloading because flow from the atmosphere down slot 65, as indicated by the arrows in FIG. 2, will allow a higher pressure to exist on the side of the fluid stream opposite the boundary layer region if the pressure in the amplifier is less than atmospheric. This is so because in such a case the pressure in the boundary layer region will always be less than atmospheric. The combined effect of the lower-than-atmospheric pressure in the boundary layer region and the atmospheric pressure on the other side of the fluid stream in chamber 222 ensures that the stream will be held against the chamber wall **222*a* or 222*b* towards which it was deflected by a control jet even though both output tubes 120 and 121 are heavily loaded by tubing or valves. If the pressure in the amplifier is greater than atmospheric then obviously there can be no flow down slot 65. Under these conditions fluid capacitances in the form of closed containers can be connected to the end of slot 65** to provide periodic pressure differentials which will aid in maintaining the stream against the chamber wall to which it is being deflected.

Fluid capacitances, preferably in the form of tubes 232 and **232*a* may be employed, although they are not essential, to stabilize the switching action of pulse converter 102. The ends of these tubes can be threadedly secured in plate 13 and communicate with tubes 242 and 252**.

Oscillation is prevented in converter 102 because the funnel shape of walls **242*a* and 252*a* and the downward extension of tip 392*b* cooperate to reflect and thereby intermix the compression and rarefaction waves as they travel through connection 162. Such reflection and intermixing ensures that the waves will not arrive at an opposite orifice as a well enough defined wave to cause deflection of the fluid stream from orifice 172*a***.

Figure 3:
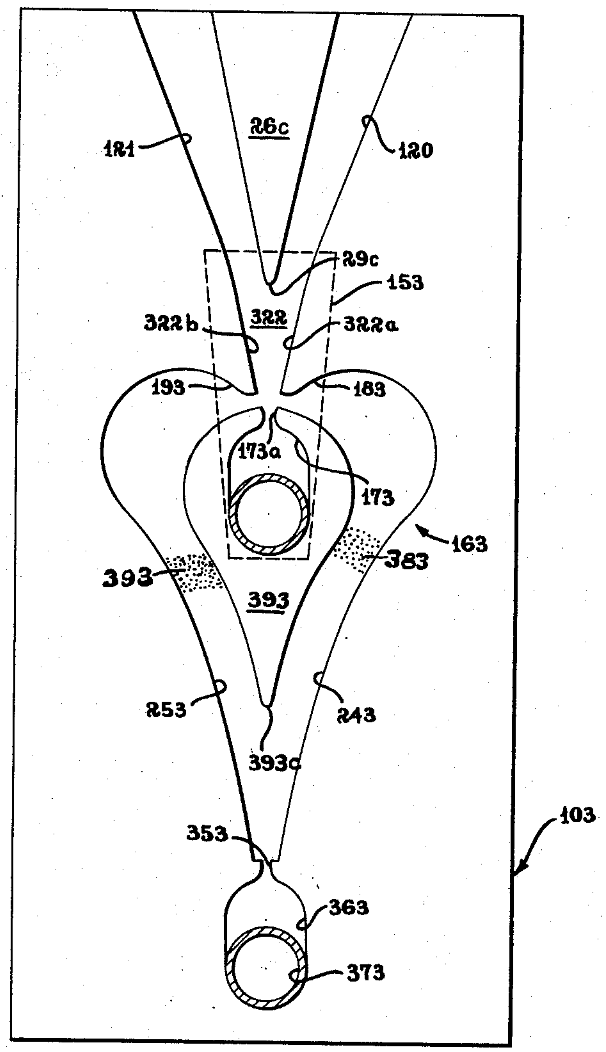
FIG. 3 is a plan view of still another possible embodiment of a pulse converter constructed in accordance with the instant invention.

FIG. 3 illustrates still another embodiment of a fluid pulse converter 103 which may be used singly or in combination with any other suitable fluid utilization device. Converter 103 comprises memory system 153, encompassed by the phantom lines, and a tube and nozzle connection 163 for effecting fluid pulse conversion memory system 153, is similar to system 152 of FIG. 2 in that the walls **322*a* and 322*b* of interaction chamber 322 are not hook-shaped. "Memory" is achieved by positioning tip 39*c* a substantial distance, that is at least twelve orifice widths of orifice 172*a* from orifice 172*a***.

Tube and nozzle connection 163 consists of tubes 243 and 253, nozzle 363 and input tube 373 and is substantially identical to connection 162, described in detail above, with the exception that tip **393*c* of divider 393 is rounded. Boundary layer control and memory is achieved in chamber 322 by the setback of walls 322*a* and 322*b* from orifice 173*a* and by providing that the distance between tip 393*c* and orifice 353** be substantial.

Pressure differentials in tubes 243 and 253 result from deflection of the power jet from nozzle 173 towards chamber walls **322*a* and 322*b* by control nozzles 193 and 183, respectively, as discussed above in describing the operation of converter 10. Oscillation is prevented in converter 103 by tapering the walls 243 and 253 and divider 393 as shown. Porous plugs 383 and 393 may also be fitted into connection 163** to break up and intermix the compression and rarefaction waves.

Porous plugs (not shown) may be fitted into the ends of output tubes 120 and 121 in converters 102 and 103 to provide optimum backloading of these output tubes.

FIG. 4 illustrates a fluid binary counter 43 constructed with a series of fluid converters **10*a*, 10*b* and 10*c*. Converters 10*a*, 10*b* and 10*c* can be regarded as being pure fluid flip-flops since they perform functions analogous to those performed by scalers or flip-flops in conventional electronic computers. Like numerals refer to like elements or parts in FIG. 1 and in FIGS. 4–9 inclusive. Converter 10*c* is identical in shape and size to converter 10 disclosed above, while converters 10*a* and 10*b* are modified by the addition of tubes 45 and 46. Tubes 45 and 46 will receive a portion of the fluid stream entering the left apertures, as viewed in the figures, of converters 10*a* and 10*b* respectively. Tubes 47 and 48 connected to tubes 45 and 46, respectively, form the input tubes for the input nozzles 36 of converters 10*b* and 10*c*. Thus, as fluid flows into the left apertures of converters 10*a* and 10*b*, a portion of this fluid will flow into input nozzles 36 of converters 10*b* and 10*c*, respectively, causing deflection of the fluid stream issuing from the power nozzles 17. Also successive pulses of fluid entering nozzles 36 of converters 10*b* and 10*c* will cause successive deflections of the stream issuing from these nozzles into opposite tubes 24 or 25 of the tube connection, as discussed above, in connection with converter 10. Fluid resistors such as porous plugs 70** are fitted into the output tubes in order to insure proper backloading of the output tubes and deflection of the fluid into the connecting tubes.

Figure 8:
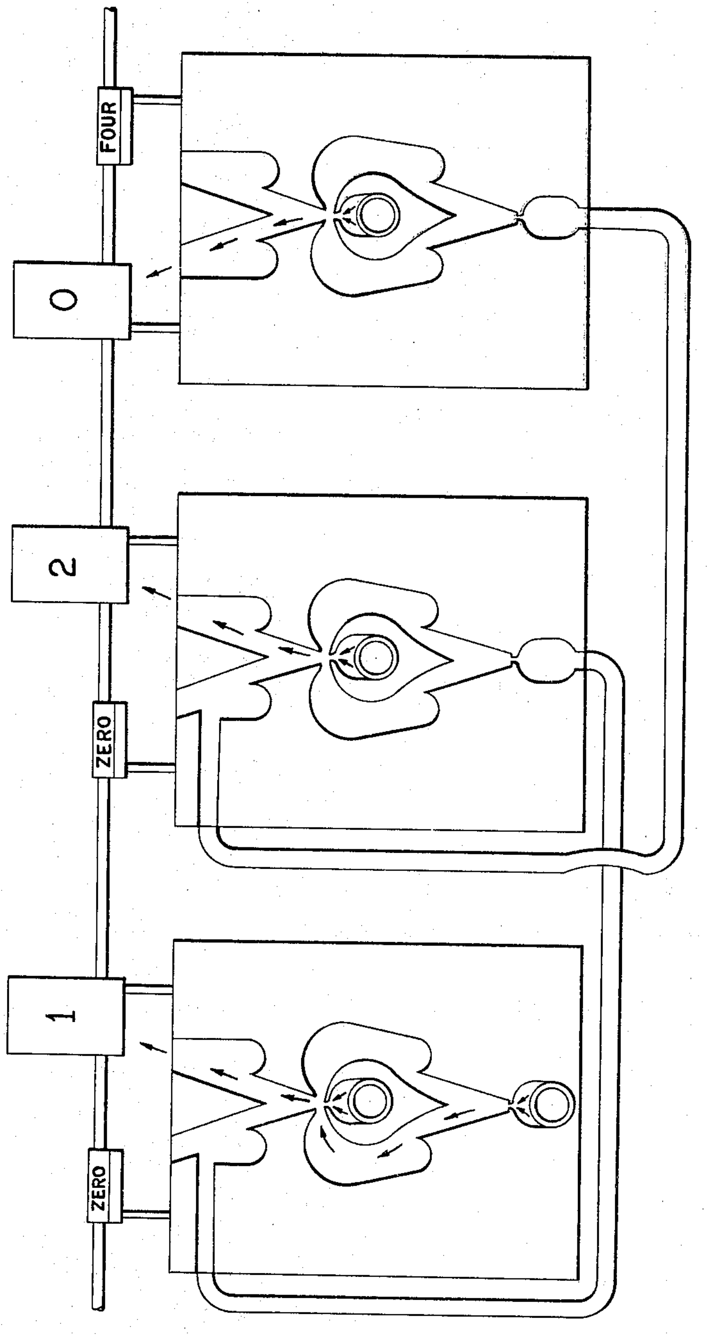

Rod 50 is fixedly mounted above the converters as shown in FIG. 4. A series of L-shaped number indicator tabs 52, **52*a*, 52*b*, 52*c*, 52*d* and 52*e* are pivotally mounted on rod 50. One such tab 52 is shown in detail in FIG. 10. Each tab has a pin 55 affixed thereto which extends from the bottom face 54 of the tab. The pin supports the tab on the tops of the converters as shown in FIGS. 4 and 8, with the bottom faces of the tab perpendicular to output tubes 120 and 121. Tab face 54 bears a large numeral on it. An identical but smaller lettered numeral is placed on the short leg 56 of the tabs. Only the large numeral is used by the operator for counting, and this numeral becomes visual to the operator only when the tab is driven upright, that is, in the direction of the arrow in FIG. 10, by a fluid stream issuing from an output tube 120 against face 54. As will be evident, tabs 52, 52*b* and 52*d* bear the numeral "0," whereas tabs 52*a*, 52*c* and 52*e*** bear numerals "1," "2," "4" in progression. Such numerical arrangements for digital counters are well known in the digital counter art.

FIGS. 5–9 inclusive, illustrate a typical counting sequence which can be produced by binary counter 43. If counter 43 receives no fluid, all tabs assume the position shown in FIG. 4. Only the lettered numerals are therefore visible to the operator. Fluid must be supplied to the power nozzles 17 of converters 10*a*, 10*b* and 10*c* before counter 43 will operate. The orifice of each power nozzle 17 in each converter 10*a*, 10*b* and 10*c* is positioned slightly closer to wall 22*a* than 22*b*. This asymmetrical positioning insures that when the fluid stream initially issues from nozzle 17 it will always lock-on to wall 22*a* and issue from output tube 120. Fluid issuing from output tubes 120 will impinge against the bottom face 54 of tabs 52, 52*a*, 52*b* and 52*c* driving the tabs to an upright position, as shown, and visually exposing the numbers "1," "2" and "4" to the operator. This is the "turn-on" position of the counter 43.

If a stream or a pulse of fluid is introduced into tube 37 supplying nozzle 36 it issues into tube 24. This will flip the stream issuing from nozzle 17 from tube 120 to tube 121. A portion of the combined fluid stream will enter tube 47 and nozzle 36 of converter 10*b* as shown by the flow lines in FIG. 5. Similarly the output of converter 10*b* is flipped from tube 120 to 121. A portion of the combined fluid stream will enter tube 48 and nozzle 36 of converter 10*c*. The output of converter 10*c* is flipped from 120 to 121. This initial pulse in tube 37 after fluid has been supplied to the power nozzles 18 is called the "reset pulse." It places the counter in the "reset" or starting position.

Figure 6:
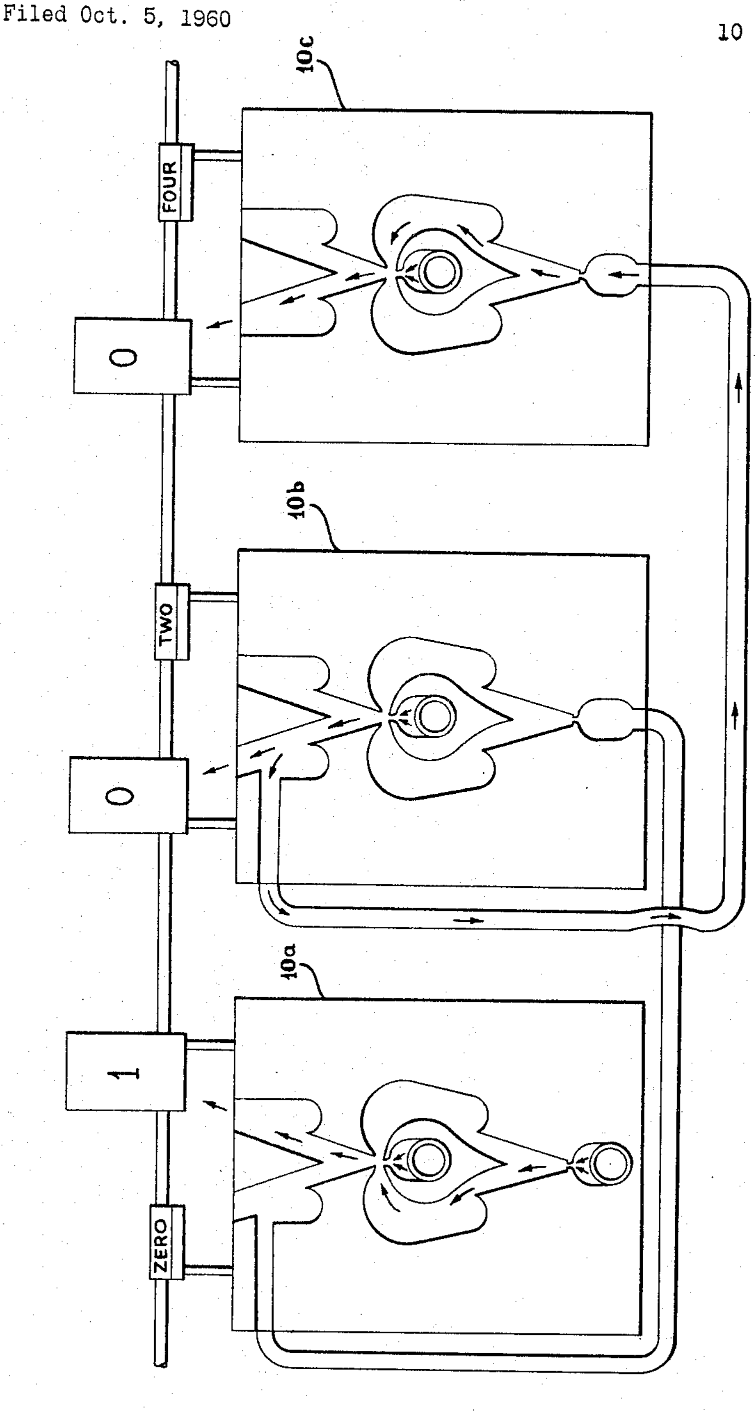

If the fluid stream supplying nozzle 36 in converter 10*a* is interrupted by a single pulse, the flow pattern in counter 43 resulting from this single pulse assumes the form shown in FIG. 6. Since the pulsing of the fluid stream entering nozzle 36 of converter 10*a* causes switching of the fluid stream from tube 121 into aperture 120, tab 52*a* will be driven upright by fluid issuing from output tube 120. Tab 52 will of course fall since it is no longer being held in the upright position by fluid issuing from output tube 121. Since neither converter 10*b* or 10*c* can receive a fluid pulse from converter 10*a*, these latter converters continue to issue fluid from the same apertures 121 causing the tabs 52*b* and 52*d* to remain upright. The operator can now see that sum of the upright tabs is "one."

Figure 7:
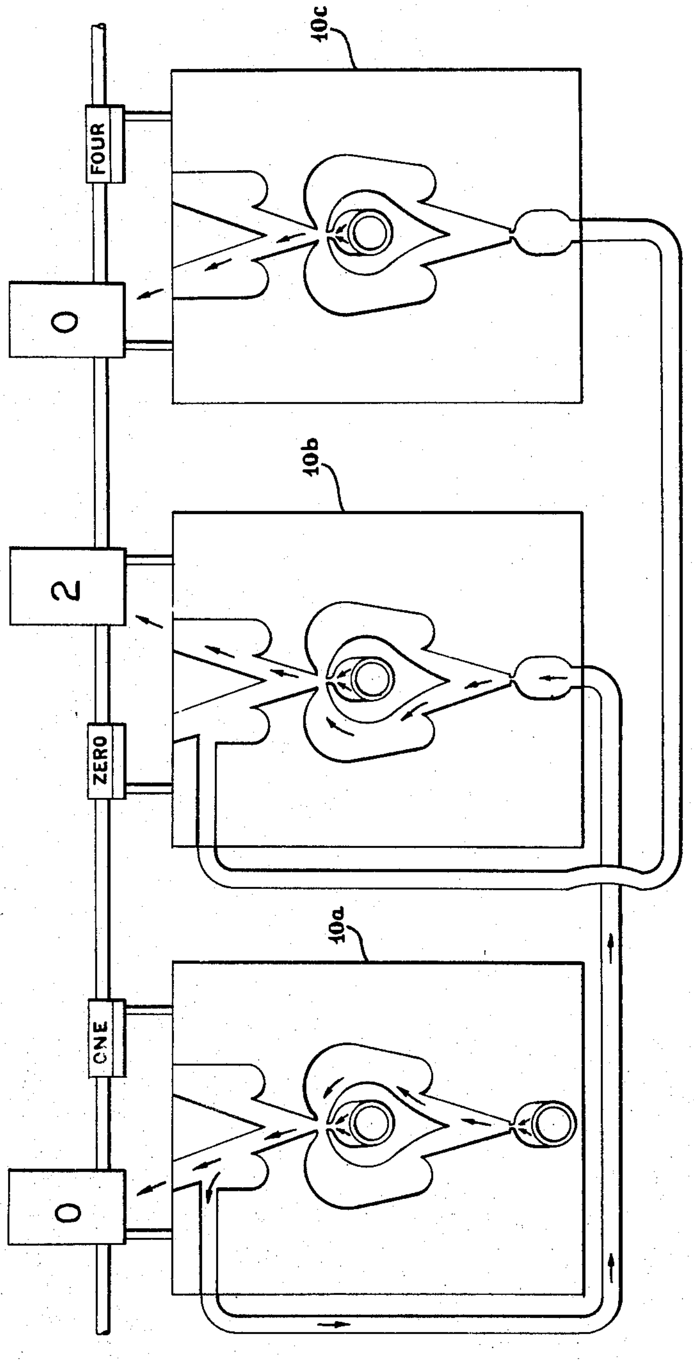

FIG. 7 illustrates the flow pattern in counter 43 when the flow to nozzle 36 in converter 10*a* is interrupted or pulsed for the second time. As will be evident, the flow in converter 10*a* is switched from tube 120 to tube 121 as a result of fluid issuing from tube 24 and control nozzle 18. A portion of fluid flowing through tube 47 causes the fluid issuing from nozzle 17 in converter 10*b* to switch from tube 121 to tube 120 driving tab 52*c* to the upright position and visually exposing numeral "2" to the operator. Tab 52*b* falls in the absence of a fluid stream issuing from tube 121. In the absence of a pulse from a control nozzle, converter 10*c* continues to issue fluid from tube 121 through which the stream was initially directed, thus retaining tab 52*d* in the upright position. Thus the operator can observe that the sum of the upright tabs 52, 52*c* and 52*d* is "two."

When the fluid supplied to nozzle 36 of converter 10*a* is pulsed again the flow pattern is as shown in FIG. 8. Converters 10*b* and 10*c* in the absence of a pulse from converter 10*a* remain as in FIG. 7. The flow from nozzle 17 in converter 10*a* being however switched into aperture 20 so as to drive number indicator tab 52*a* to an upright position. The sum of the upright tabs 52*a*, 52*c* and 52*d* is now "three."

Figure 9:
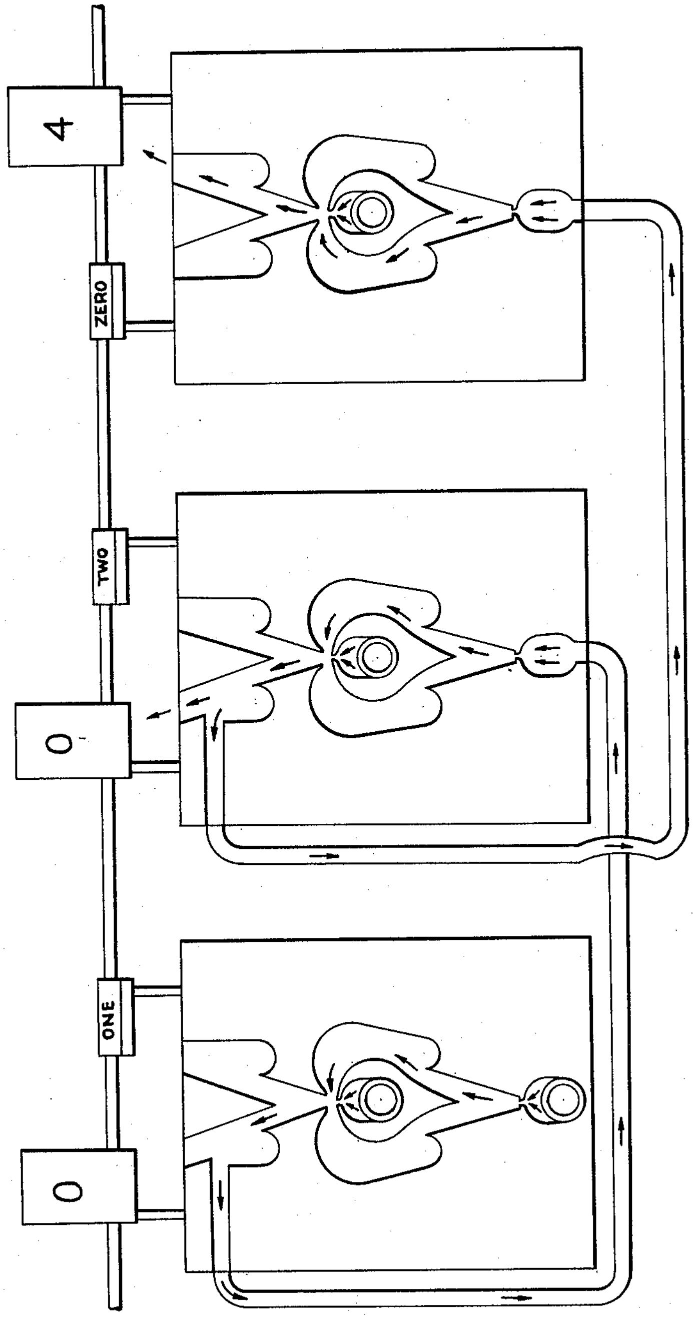

FIG. 9 illustrates the flow pattern in counter 43 when the fluid supplied to nozzle 36 in converter 10*a* is interrupted or pulsed for the fourth time. Converters 10*a* and 10*b* have the same flow pattern as shown in FIG. 6, whereas the fluid issuing from converter 10*c* is caused to switch from tube 121 to tube 120 driving tab 55*e* upright and exposing the numeral "4." The sum of the upright tabs 52, 52*b* and 52*e* is "four."

Counter 43, as shown, is capable of counting up to seven successive fluid pulses before it resets. As will be evident, the reset occurs on the eighth pulse after the initial reset pulse and results in tabs 52, 52*b* and 52*d* being driven upright exposing a series of "zeros" to the operator. Those in the art will appreciate that by merely increasing the number of fluid converters fluid counter 43 may count any number of successive fluid pulses before the counter resets.

FIG. 10 is a partial sectional view of the output end of a pure fluid converter and a detailed view of a typical associated number indicator tab although it is obvious that other types of number indicators may also be used. As can be seen from this figure, the fluid issuing from the output tubes impinges upon the "number" face 54 of the tab 52 so as to drive the tab to an upright position. Should fluid no longer impinge upon this face the tab will fall to the position shown in this figure as will be apparent.

It will be evident that either of the other two embodiments of fluid converters disclosed above may also be used in fluid binary counters. The fluid converters of this invention may also be employed in other and different fluid systems, singly or in combination, wherever their unique characteristics may be advantageously utilized.

I claim as my invention:

1. A fluid pulse converter for converting sequential fluid pulses into alternating fluid pulses, said converter comprising a fluid amplifier of the boundary layer control type in which a pair of control nozzles are positioned to alternately deflect a fluid stream flowing through said amplifier as a result of said nozzles issuing alternating fluid jets and a pair of tubes joining said nozzles together so that a pressure differential is created between said nozzles as a result of said power jet being deflected closer to one nozzle than the other, and means for supplying sequential fluid pulses into said tubes, said pressure differential causing sequential fluid pulses received by said pair of tubes to issue alternately from each nozzle of said pair.

2. The fluid pulse converter as claimed in claim 1 wherein the walls of each tube of said pair has a sharp change of slope so that a fluid vortex is created in a tube whenever fluid flows therethrough, said vortex aiding said fluid to lock-on to the walls of the tubes.

3. A fluid pulse converter adapted to issue an alternating fluid stream from a pair of output tubes of a pure fluid amplifier incorporated in said converter as a result of a single input tube receiving a sequential series of pulsed fluid signals, said pulse converter comprising a fluid amplifier through which a fluid stream can flow, a pair of opposed control nozzles in said amplifier adapted to switch the fluid stream flowing through said amplifier from one output tube to another as a result of alternating jets of fluid issuing from said nozzles, and tube and nozzle means adapted to convert and convey successive fluid signals received thereby alternately to each of said control nozzles.

4. A system for converting sequential fluid pulses into alternating fluid pulses comprising a pair of tubes, an input nozzle and a pair of opposed control nozzles, means for issuing fluid between said control nozzles, each tube of said pair having two ends, one end of each tube being connected to one end of each control nozzle so that a pressure differential is created in said tubes, the other ends of said tubes joining such that the inner walls of each tube intersect to form a fluid flow divider, said input nozzle positioned to issue fluid into said other ends of said tubes.

5. A system for converting sequential fluid pulses into alternating fluid pulses comprising, a pair of tubes, an input nozzle and a pair of opposed control nozzles, means for issuing fluid between said control nozzles, each tube of said pair having two ends, one end being connected to each control nozzle, the other ends of said tubes joining together such that the inner walls of each tube intersect to form a fluid flow divider, said input nozzle positioned to issue fluid into said other ends of said tubes and receiving said sequential fluid pulses, the orifice of said input nozzle being substantially symmetrically aligned with said flow divider.

6. A fluid pulse converter for converting sequential fluid pulses into alternating fluid pulses, said converter comprising a fluid amplifier in which a pair of control nozzles are positioned to alternately deflect a fluid stream flowing through said amplifier as a result of said nozzles issuing alternating fluid jets, fluid conveying means joining said nozzles together so that a pressure differential is created between said nozzles as a result of said power jet being deflected closer to one nozzle than the other, and means for supplying sequential fluid pulses into said fluid conveying means, said pressure differential causing sequential fluid pulses received by said fluid conveying means to issue alternately from each nozzle of said pair.

7. The fluid pulse converter as claimed in claim 6 wherein said fluid amplifier possesses a memory characteristic.

8. A fluid pulse converter for converting sequential fluid pulses into alternating fluid pulses, said converter comprising a pair of control nozzles positioned to alternately deflect a power jet of fluid from one nozzle to the other as a result of fluid issuing therefrom, means for issuing a power jet between said nozzles, tube means joining said nozzles together so that a pressure differential is created between said nozzles as a result of said power jet being deflected closer to one nozzle than the other, and means for supplying sequential fluid pulses into said tubes, said pressure differential causing sequential fluid pulses received by said tube means to issue alternately from each nozzle of said pair.

9. A fluid pulse converter for converting sequential fluid pulses into alternating fluid pulses, said converter comprising a pair of control nozzles positioned to alternately deflect a power jet of fluid from one nozzle to the other as a result of fluid issuing therefrom, diverging walls housing said nozzles, an orifice issuing a power jet between said nozzles, said diverging walls being setback from said orifice so that said power jet remains lock-on to the diverging wall against which it is deflected by fluid issuing from said control nozzles, fluid conveying means adapted to create a pressure differential between said nozzles as a result of said power jet remaining locked-on to a diverging wall, and means for supplying sequential fluid pulses into said fluid conveying means, said pressure differential causing sequential fluid pulses received by said tube means to issue alternately from each nozzle of said pair.

10. A fluid pulse converter for converting sequential fluid pulses into alternating fluid pulses, said converter comprising a pair of control nozzles positioned to alternately deflect a power jet of fluid from one nozzle to the other as a result of fluid issuing therefrom, diverging walls housing said nozzles, an orifice issuing a power jet between said nozzles, said diverging walls being setback from said orifice so that said power jet remains locked-on to the diverging wall against which it is deflected by fluid issuing from said control nozzles, tube means joining said nozzles together so that a pressure differential is created between said nozzles as a result of said power jet remaining locked-on to a diverging wall, and means for supplying sequential fluid pulses to said tubes, said pressure differential causing sequential fluid pulses received by said tube means to issue alternately from each nozzle of said pair.

11. A fluid pulse converter adapted to issue an alternating fluid stream from a pair of output tubes of a pure fluid amplifier incorporated in said converter as a result of a single input tube receiving a sequential series of pulsed fluid signals, said pulse converter comprising: a fluid amplifier through which a fluid stream can flow, a pair of substantially opposed control nozzles in said amplifier adapted to switch the fluid stream flowing through said amplifier from one output tube to another as a result of said nozzles issuing alternating jets of fluid and means adapted to convert and convey successive fluid signals received thereby alternately to each of said control nozzles, said means comprising a pair of tubes and an input nozzle, one end of each tube of said pair communicating with one of said control nozzles, the other ends of the tubes intersecting to form a junction, said input nozzle connected to said other ends and adapted to issue sequential fluid pulses into said junction.

12. A fluid pulse converter adapted to issue an alternating fluid stream from a pair of output tubes of a pure fluid amplifier incorporated in said converter as a result of a single input tube receiving a sequential series of pulsed fluid signals, said pulse converter comprising: a fluid amplifier through which a fluid stream can flow, a pair of substantially opposed control nozzles in said amplifier adapted to switch the fluid stream flowing through said amplifier from one output tube to another as a result of alternating jets of fluid issuing from said nozzles, and a system for converting sequential fluid pulses into alternating fluid pulses cooperating with said control nozzles and comprising, a pair of tubes and an input nozzle, each tube of said pair having two ends, one end of each tube being connected to one end of each control nozzle so that a pressure differential is created in said tubes, the other ends of said tubes joining such that the inner walls of each tube intersect to form a fluid flow divider, said input nozzle positioned to issue sequential pulses of fluid into said other ends of said tubes.

13. A fluid pulse converter as claimed in claim 12, where in the outer walls said other ends of said tubes are set back from the orifice of said nozzle.

14. A fluid converter as claimed in claim 13, wherein each of said outer walls is formed with a sharp change of slope.

15. A fluid binary counter adapted to count a series of successive fluid pulses received from a source of pulsed fluid signals, comprising a series of fluid pulse converters, each converter having an input tube and a pair of output tubes, said converters being constructed and arranged so as to switch fluid flow into certain of said output tubes when sequential fluid pulses are received by the input tube of the first converter comprising the series, and indicator means actuated by fluid issuing from said output tubes.

16. A fluid binary counter adapted to count sequentially fluid pulses received from a source of pulsed fluid signals, comprising: a series of fluid pulse converters, each converter having an input tube and a pair of output tubes and being constructed and arranged so as to switch fluid flow into certain of said output tubes when successive fluid pulses are received by the input tube, one output tube of each pair communicating with the input tube of another converter in the series, and counting means actuated by fluid flowing from the output tubes of each converter.

17. A fluid system for converting sequential fluid pulses to alternating fluid pulses, comprising a pair of fluid flow conveying members joined at one end thereof, means communicating with said one end for issuing sequential fluid pulses into said members, nozzles connected to the other ends of said members, and means for issuing a fluid stream between said nozzles.

18. A fluid system for converting sequential fluid pulses into alternating fluid pulses, comprising a pair of fluid flow conveying members joined at one end thereof, an input nozzle communicating with said one end for issuing sequential fluid pulses into said members, control nozzles connected to the other ends of said members, and nozzle means for issuing a fluid stream between said nozzles.

19. A fluid system for converting sequential fluid pulses to alternating fluid pulses, comprising a pair of diverging fluid flow conveying members connected together at one end thereof, an opening formed in said one end, means for supplying fluid to said opening, a pair of nozzles connected to the diverging ends of said members, said control nozzles being positioned substantially opposite each other, and means for issuing a fluid stream between said nozzles.

References Cited in the file of this patent

UNITED STATES PATENTS

| | | |
|---|---|---|
| 2,105,473 | Dean | Jan. 18, 1938 |
| 2,202,216 | Madsen | May 28, 1940 |

Disclaimer 3,001,698.—*Raymond W. Warren*, McLean, Va. FLUID PULSE CONVERTER. Patent dated Sept. 26, 1961. Disclaimer filed Jan. 17, 1964, by the assignee, *the United States of America as represented by the Secretary of the Army.*

Hereby enters this disclaimer to claim 3 of said patent.

[*Official Gazette March 31, 1964.*]